(12) United States Patent
Zhou et al.

(10) Patent No.: US 11,978,144 B2
(45) Date of Patent: May 7, 2024

(54) RESOLVING GARMENT COLLISIONS USING NEURAL NETWORKS

(71) Applicant: Adobe Inc., San Jose, CA (US)

(72) Inventors: Yi Zhou, San Jose, CA (US);
Yangtuanfeng Wang, London (GB);
Xin Sun, Palo Alto, CA (US);
Qingyang Tan, Greenbelt, MD (US);
Duygu Ceylan Aksit, London (GB)

(73) Assignee: Adobe Inc., San Jose, CA (US)

( * ) Notice: Subject to any disclaimer, the term of this patent is extended or adjusted under 35 U.S.C. 154(b) by 119 days.

(21) Appl. No.: 17/875,081

(22) Filed: Jul. 27, 2022

(65) Prior Publication Data

US 2024/0037827 A1 Feb. 1, 2024

(51) Int. Cl.
*G06T 17/30* (2006.01)
*G06T 13/40* (2011.01)

(52) U.S. Cl.
CPC .......... *G06T 13/40* (2013.01); *G06T 2210/16* (2013.01); *G06T 2210/21* (2013.01)

(58) Field of Classification Search
None
See application file for complete search history.

(56) References Cited

U.S. PATENT DOCUMENTS

| 11,321,916 | B1 * | 5/2022 | Zhang | G06T 19/00 |
| 2021/0118239 | A1 * | 4/2021 | Santesteban | G06N 3/044 |
| 2022/0237879 | A1 * | 7/2022 | Wu | G06T 15/04 |

OTHER PUBLICATIONS

Bertiche, H. et al., "Neural Implicit Surfaces for Efficient and Accurate Collisions in Physically Based Simulations," arXiv:2110.01614v1 [cs.GR], 7 pages.
Gropp, A. et al., "Implicit Geometric Regularization for Learning Shapes," arXiv:2002.10099v2 [cs.LG], Jul. 9, 2020, 14 pages.
Park, J.J. et al., "DeepSDF: Learning Continuous Signed Distance Functions for Shape Representaion," arXiv:1901.05103v1 [cs.CV], Jan. 16, 2019, 19 pages.
Patel, C. et al., "TailorNet: Predicting Clothing in 3D as a Function of Human Pose, Shape and Garment Style," arXiv:2003.04583v2 [cs.CV], Mar. 15, 2020, 11 pages.

* cited by examiner

*Primary Examiner* — Sultana M Zalalee
(74) *Attorney, Agent, or Firm* — Nicholson De Vos Webster & Elliott LLP

(57) ABSTRACT

Embodiments are disclosed for using machine learning models to perform three-dimensional garment deformation due to character body motion with collision handling. In particular, in one or more embodiments, the disclosed systems and methods comprise receiving an input, the input including character body shape parameters and character body pose parameters defining a character body, and garment parameters. The disclosed systems and methods further comprise generating, by a first neural network, a first set of garment vertices defining deformations of a garment with the character body based on the input. The disclosed systems and methods further comprise determining, by a second neural network, that the first set of garment vertices includes a second set of garment vertices penetrating the character body. The disclosed systems and methods further comprise modifying, by a third neural network, each garment vertex in the second set of garment vertices to positions outside the character body.

20 Claims, 9 Drawing Sheets

RESOLVING GARMENT COLLISIONS USING NEURAL NETWORKS

BACKGROUND

Animation involves the manipulation of characters and/or objects to give the appearance of movement. When the animation involves an animated character with clothing, the deformation and movement of the clothing or garment should correlate to the movement of the animated character body and garment-body collisions should be avoided. To generate accurate cloth deformations, most techniques are based on physically based simulation. Common physically based models include the mass-spring system, the finite element approach, the thin-shell model, and other techniques. Other recent techniques use machine learning methods to predict three-dimensional clothing deformations. However, these existing solutions have limitations and drawbacks, as they can be computationally intensive, while also producing inaccurate results.

SUMMARY

Introduced here are techniques/technologies that allow a digital design system to use machine learning models to predict three-dimensional garment deformations due to character body motion and resolve garment-character body collisions in real-time, during inference. The digital design system uses three neural networks to identify initial garment vertex locations defining the shape of a garment relative to a character body, determine which of the initial garment vertex locations are body-penetrating (e.g., colliding), and determine an offset distance to move the body-penetrating garment vertices to generate a modified set of garment vertices in which the body-penetrating collisions are resolved.

In particular, in one or more embodiments, a digital design system can receive an input including parameters defining a character body (e.g., character body shape parameters and the character body pose parameters) and a garment (e.g., garment style parameters). The digital design system can then use a first neural network (e.g., a garment prediction network) to predict a first set of garment vertices that define the shape and deformations of the garment relative to the character body. The digital design system then uses a second neural network to determine the distance value of each garment vertex to the surface of the character body and determine which other first set of garment vertices are penetrating (e.g., located inside) the character body. The digital design system then uses a third neural network to predict an offset distance along a direction of a gradient of the distance value associated with the corresponding garment vertex.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
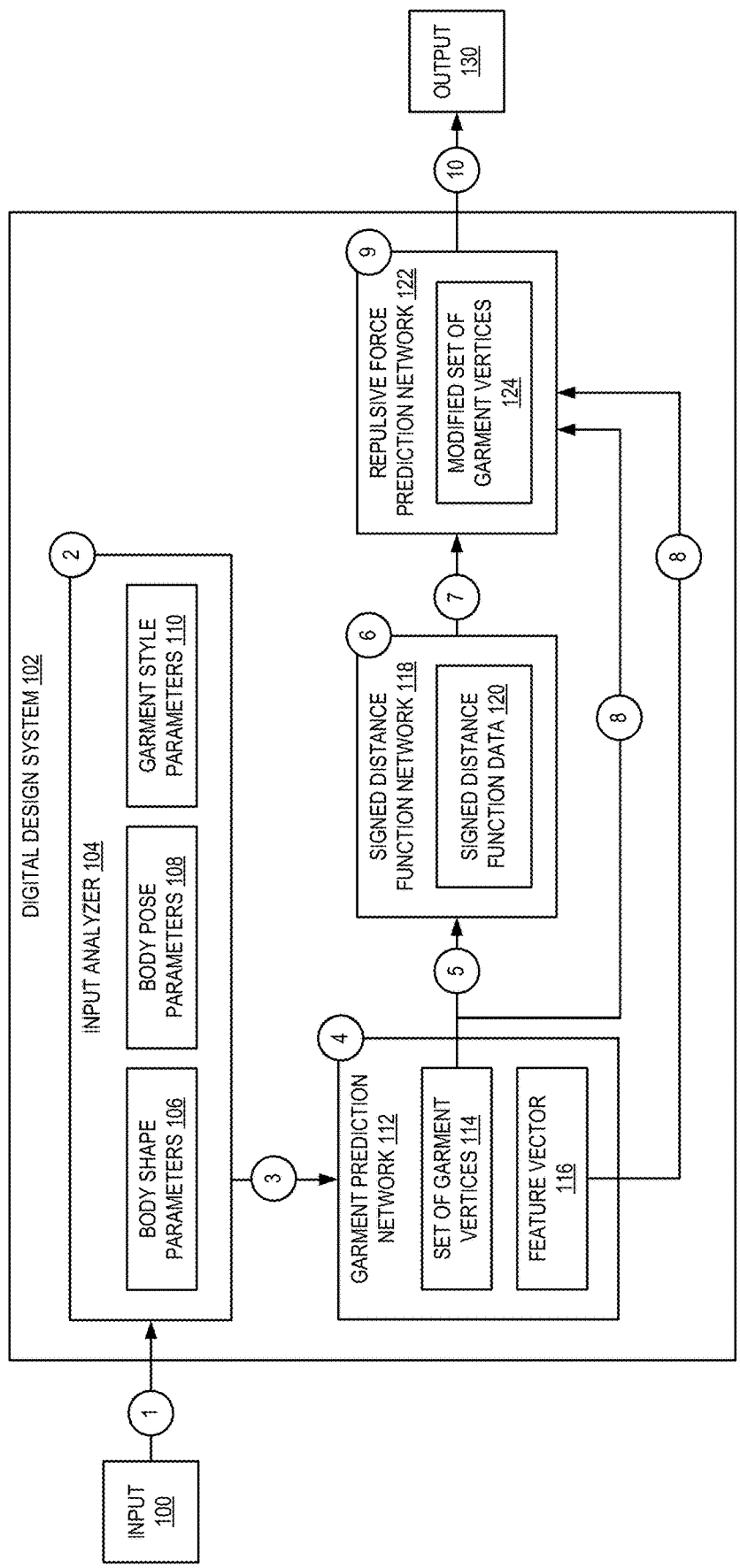
FIG. 1 illustrates a diagram of a process of using machine learning models to perform three-dimensional garment deformation due to character body motion with collision handling in accordance with one or more embodiments.

One or more embodiments of the present disclosure include a digital design system that uses trained neural networks to predict three-dimensional garment deformation due to character body motion with collision handling. Predicting how a three-dimensional garment deforms in response to the underlying three-dimensional character body motion is essential for many applications, including realistically dressed human body re-construction, interactive garment design, virtual try-on, and robotics control.

Some existing solutions to determine garment deformations with a character body are based on physically based simulation. However, these methods tend to be computationally intensive since they typically involve solving large linear systems and handling collisions. In particular, robust collision handling based on collision detection and response computation is a critical component of cloth or garment simulation. Even a single missed collision can considerably affect the accuracy of the overall simulator. The most accurate physically based simulators run at 0.5 seconds per frame on commodity GPUs, where collision handling can take 50-80% of total simulation time. As a result, these simulators are unable to provide real-time performance for interactive applications such as gaming and virtual try-on.

Other existing solutions introduce neural network methods to predict three-dimensional cloth deformations. However, a common setback of such methods is the lack of efficient handling of collisions between the garments and the character body surface. For some tight clothes, the collision-free models can be particularly challenging for these solutions. Thus, because these solution result in garment collisions with the body mesh, it affects their reliability and usefulness for many applications related to rendering, simulation and animation.

One way to address body-garment collisions is to perform post-processing optimization. However, these optimization approaches can take considerable CPU time (around 0.6-0.8 seconds per frame), which can be expensive for interactive applications. A more common practice is to apply specialized collision loss functions during training. However, this only provides a soft constraint to avoid collisions for network training, and the network still cannot handle the penetrated vertices when collisions occur during inference.

To address these issues, the digital design system uses multiple machine learning models to detect body-penetrating garment vertices and determine offsets to move the body-penetrating garment vertices outside the character body, during inference. Based on the signed distance function (SDF) of the underlying character body and initial garment vertices positions, a neural network layer, a Repulsive Force Unit (ReFU) predicts the per-vertex offsets that push body-penetrating garment vertices to collision-free configurations while preserving the fine geometric details of the garment. The ReFU collects repulsive forces as part of time integration to model the effects of repulsive forces. The ReFU computes the force based on the implicit field of the body geometry to detect the set of body-penetrating garment vertices and the repulsive direction. The repulsive strength is predicted by the neural network inside the ReFU layer. In some embodiments, instead of simply pushing the problematic garment vertices to the character body surface, ReFU further applies a flexible offset to move them, improving the overall collision handling performance. For example, this can avoid additional edge-edge (EE) collisions which normally cannot be detected by the signed distance of the vertices and overcome the artifacts in the estimated implicit functions of the human body.

The embodiments described herein provide a significant increase in speed and scalability. For example, the digital design system described herein can resolve body-penetrating garment vertices in real-time, during inference. By resolving collisions during inference, the digital design system can reduce or eliminate the need to perform post-processing optimizations, resulting in a more accurate garment deformation relative to the character body without the computational time of existing solutions.

FIG. 1 illustrates a diagram of a process of using machine learning models to perform three-dimensional garment deformation due to character body motion with collision handling in accordance with one or more embodiments. As shown in FIG. 1, the digital design system 102 receives an input 100, as shown at numeral 1. For example, the digital design system 102 receives the input 100 from a user via a computing device or from a memory or storage location. As illustrated in FIG. 1, the digital design system 102 includes an input analyzer 104 that receives the input 100.

As illustrated in FIG. 1, the digital design system 102 includes an input analyzer 104 that receives the input 100. In some embodiments, the input analyzer 104 analyzes the input 100, at numeral 2, to identify information defining a body of a three-dimensional character or figure, including body shape parameters 106, $\beta$, and body pose parameters 108, $\theta$. The input analyzer 104 can further identify garment style parameters 110, $\gamma$. After the input analyzer 104 analyzes the input 100 and extracts the body shape parameters 106, the body pose parameters 108, and the garment style parameters 110, the extracted information is sent to a garment prediction network 112, as shown at numeral 3. In one or more other embodiments, the input analyzer 104 optionally stores the body shape parameters 106, the body pose parameters 108, and the garment style parameters 110 in a memory or storage location for later access.

In one or more embodiments, the garment prediction network 112 processes the body shape parameters 106, the body pose parameters 108, and the garment style parameters 110 to generate a set of garment vertices 114, at numeral 4.

In one or more embodiments, the garment prediction network 112 is a trained neural network. In one or more embodiments, a neural network includes deep learning architecture for learning representations of real-world data. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

The garment prediction network 112 is a machine learning model trained to estimate the deformations of a garment with a three-dimensional character body with fine details from input body shape parameters 106, body pose parameters 108, and garment style parameters 110. In one or more embodiments, the garment prediction network 112 is the TailorNet garment prediction network. In one or more embodiments, the garment prediction network 112 utilizes neural network to predict low and high frequency components of the garment vertices. The low frequency component is generalizable to all inputs. The high frequency components are based on pre-trained input sets (e.g., body shape parameters, body pose parameters, and garment style parameters) and are synthesized based on the distance for current inference inputs to pre-trained input sets. The set of garment vertices 114 generated by the garment prediction network 112 indicate the three-dimensional position of the garment.

The garment prediction network 112 can further generate a feature vector 116, z, which can be computed from the body shape parameters 106, the body pose parameters 108, and the garment style parameters 110 with a multilayer perceptron (MLP) function h, as follows:

$$z = h(\vec{\beta}, \vec{\theta}, \vec{\gamma})$$

After generating the set of garment vertices 114, the set of garment vertices 114 are sent to signed distance function network 118, as shown at numeral 5. In one or more embodiments, the signed distance function network 118 is a neural network trained to generate signed distance function data 120 for the set of garment vertices 114, at numeral 6. The signed distance function data 120 includes a distance value of each garment vertex in the set of garment vertices 114 to a closet point on the surface of the character body. The signed distance function data 120 also includes the gradient of the distance value of each garment vertex in the set of garment vertices 114.

Given a query garment vertex x, the signed distance function $f$ returns its distance to the closest point on the corresponding surface of the character body, as follows:

$$f(x) = s, x \in \mathbb{R}^3, s \in \mathbb{R}$$

where the sign of the distance value indicates whether the point is inside the character body (negative) or outside the character body (positive). The zero-level set of $f(x)$ indicates the garment vertex is at the surface of the character body.

For a garment vertex with a negative signed distance function value, $x_i$, the gradient of the signed distance function at $x_i$ points towards the nearest point on the surface of the character body along the normal direction. The normalized gradient of $f$ at x can be calculated as follows:

$$\nabla_r \vec{f}(x) = \frac{\nabla_x f(x)}{\|\nabla_x f(x)\|_2}$$

In one or more embodiments, the approximated signed distance function values predicted by the neural network of the signed distance function network 118 may not be a unit vector and may need to be normalized.

The signed distance function data 120 generated by the signed distance function network 118 is then sent to a repulsive force prediction network 122, as shown at numeral 7. In one or more embodiments, the repulsive force prediction network 122 receives, or retrieves, the set of garment vertices 114 and the feature vector 116 generated by the garment prediction network 112, as shown at numeral 8. In some embodiments, the repulsive force prediction network 122 retrieves the data from a memory or storage location.

In one or more embodiments, the repulsive force prediction network 122 generates a modified set of garment vertices 124 using the set of garment vertices 114, the feature vector 116, and the signed distance function data 120, at numeral 9. The modified set of garment vertices 124 includes both unmodified garment vertices (e.g., the garment vertices with positive signed distance function values and thus determined to be located at a point outside of the character body) and modified garment vertices (e.g., the garment vertices determined to be located at a point inside of the character body or at the surface of the character body). In one or more embodiments, each of the garment vertices of the modified garment vertices are moved an offset distance from the original location of the garment vertex (e.g., within the character body) to an updated location outside the character body.

The repulsive force prediction network 122 is a neural network trained to determine modified positions of body-penetrating garment vertices to resolve the collision while preserving original wrinkles and other details on the garments. The repulsive force prediction network 122, or repulsive force unit (ReFU) is designed to move the garment vertices along a repulsion direction, which is towards the closest point on the surface of the character body.

The ReFU for a garment vertex, $x_i$, can be formulated as follows:

$$ReFU(x_i) = \begin{cases} x_i - d_i \nabla_x \vec{f}(x_i), & \text{where } f(x_i) < 0; \\ x_i & \text{otherwise,} \end{cases}$$

where $x_i$ is a predicted offset scalar indicating the amount of movement.

Figure 2:
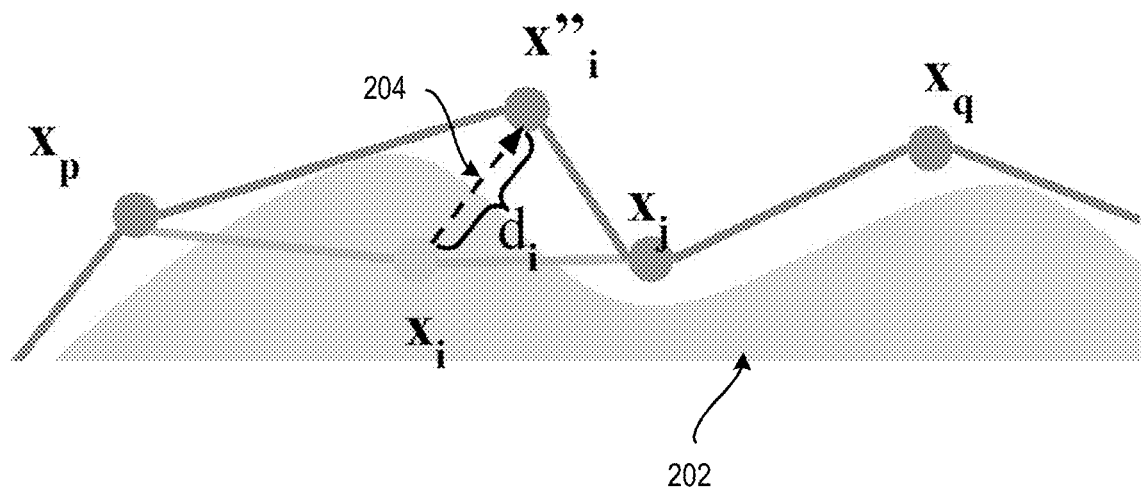
FIG. 2 illustrates an example garment collision resolution process using a repulsive force prediction network in accordance with one or more embodiments.

FIG. 2 illustrates an example garment collision resolution process using a repulsive force prediction network in accordance with one or more embodiments. FIG. 2 further depicts four garment vertices ($x_i$, $x_j$, $x_p$, and $x_q$) generated by a garment prediction network (e.g., garment prediction network 112) using input body shape parameters, body pose parameters, and garment style parameters. As illustrated in FIG. 2, garment vertex $x_i$ is located inside the character body and garment vertices $x_j$, $x_p$, and $x_q$ are outside the character body. Character body region 202 represents the character body and the line segments connecting the garment vertices represents the garment position. The locations of the garment vertices inside or outside the character body can be determined by passing the garment vertices through a signed distance function (e.g., signed distance function network 118). As garment vertex $x_i$ is inside the character body, a repulsive force prediction network (repulsive force prediction network 122) can be used to determine an offset to move the body-penetrating garment vertex outside the character body using data from the signed distance function network 118. Dashed line 204 represents the direction of the gradient of the signed distance function for garment vertex $x_i$. As illustrated in FIG. 2, the repulsive force prediction network 122 predicts an amount of movement, $d_i$, to move the body-penetrating garment vertex from the location of garment vertex $x_i$ to the location of garment vertex $x''_i$, outside the character body.

In one or more embodiment, the moving offset, $d_i$, can be determined directly using the signed distance function value or the corresponding garment vertex. However, while this can solve the Vertex-Face (VF) collisions, it may not solve all Edge-Edge (EE) collisions. In some embodiment, to resolve the EE collisions, the repulsive force prediction network 122 pushes the two neighboring garment vertices further outside the character body. To compute the final offset, the repulsive force prediction network 122 predicts $\alpha_i$, the scale of movement, and multiplies it with the signed distance function value, as follows:

$$d_i = \alpha_i f(x_i), \alpha \in \mathbb{R},$$

where $\alpha_i$ is predicted based on the feature vector z (e.g., feature vector 116) of the whole garment, and the signed distance function value of vertex $x_i$, as follows:

$$\alpha_i = g(k(z)_i, f(x_i)), z \in \mathbb{R}^M$$

where k: $\mathbb{R}^M \to \mathbb{R}^{N \times D}$ is a topology-dependent Multilayer Perceptron (MLP) network that infers the latent vector for every vertex from the feature vector z (e.g., feature vector 116), and $k(z)_i \in \mathbb{R}^D$ is for i-th vertex $x_i$. g is another MLP that outputs the movement scale for $x_i$. Both $g(\cdot, \cdot)$, and $k(\bullet)$ are jointly trained with the garment prediction network 112 in an end-to-end manner. experiments.

Figure 3:
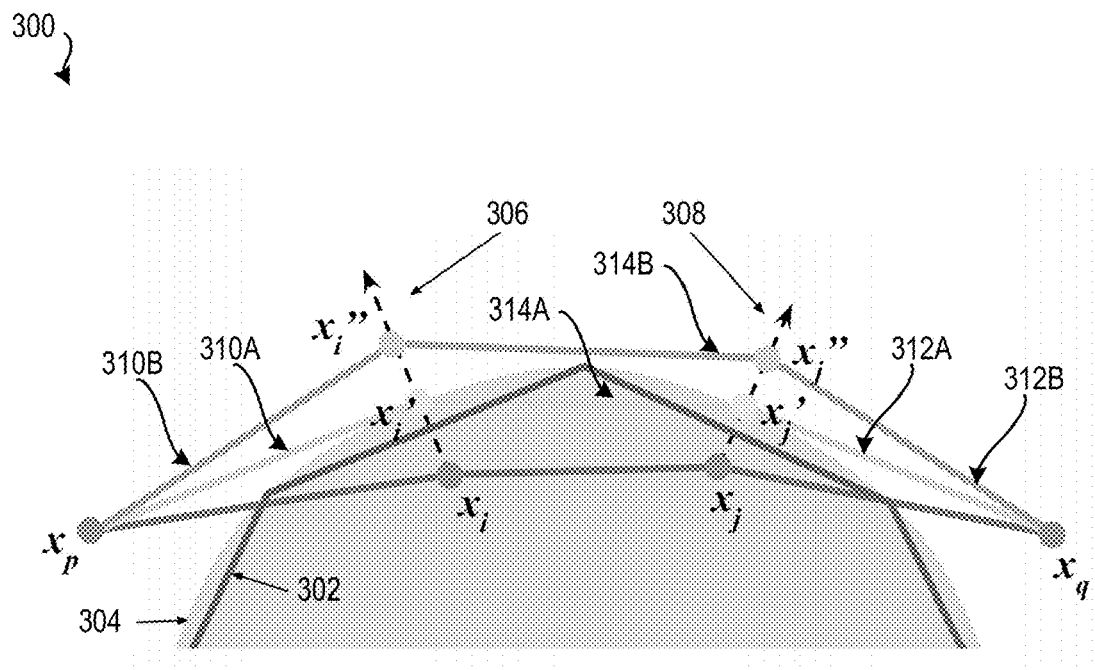
FIG. 3 illustrates an example edge-edge garment collision resolution process using a repulsive force prediction network in accordance with one or more embodiments.

FIG. 3 illustrates an example edge-edge garment collision resolution process using a repulsive force prediction network in accordance with one or more embodiments. The line 302 represents a portion of a character body mesh and character body region 304 is the character body represented by the signed distance function estimator $f$. FIG. 3 further depicts four garment vertices ($x_i$, $x_j$, $x_p$, and $x_q$) generated by a garment prediction network (e.g., garment prediction network 112) using input body shape parameters, body pose parameters, and garment style parameters. As illustrated in FIG. 3, garment vertices $x_i$ and $x_j$ are inside the character body and garment vertices $x_p$ and $x_q$ are outside the character body. The locations of the garment vertices inside or outside the body can be determined by passing the garment vertices through a signed distance function (e.g., signed distance function network 118). As garment vertices $x_i$ and $x_j$ are inside the character body, a repulsive force prediction network (repulsive force prediction network 122) can be used to determine an offset to move the body-penetrating garment vertices outside the character body. Dashed line 306 represents the direction of the gradient of the signed distance function for garment vertex $x_i$ and dashed line 308 represents the direction of the gradient of the signed distance function for garment vertex $x_j$. If $\alpha_{i,j}$ is set to "1" and the moving offset is set as $|f(x_{i,j})|$, garment vertices $x_i$ and $x_j$ may be moved along their respective gradients to garment vertices $x'_i$ and $x'_j$, respectively. However, while the vertex-face collisions of garment vertices $x_i$ and $x_j$ are resolved and the collisions along garment edge 310A (e.g., $\overline{x_p x'_i}$, the edge between garment vertices $x_p$ and $x'_i$) and garment edge 312A (e.g., $\overline{x_q x'_j}$, the edge between garment vertices $x_q$ and $x'_j$) are resolved, garment edge 314A (e.g., $\overline{x'_i x'_j}$, the edge between garment vertices $x'_i$ and $x'_j$) will still induce a collision as it is still located within the character body region 304. By increasing the scale of movement, $\alpha$, to a value greater than "1", garment vertices $x_i$ and $x_j$ may be moved along their respective gradients to garment vertices $x''_i$ and $x''_j$, respectively. At these positions, both the vertex-face collisions of garment vertices $x_i$ and $x_j$ and the edge-edge collisions by the garment edges (e.g., garment edges 310B, 312B, and 314B) associated with garment vertices $x_i$ and $x_j$ are resolved.

Returning to FIG. 1, in one or more embodiments, the digital design system 102 provides an output 130, including the modified set of garment vertices 124, as shown at numeral 10. In one or more embodiments, after the process described above in numerals 1-9 the output 130 is sent to the user or computing device that initiated the process of three-dimensional garment deformation due to character body motion with the digital design system 102, to another computing device associated with the user or another user, or to another system or application. For example, after the process described above in numerals 1-9, the modified set of garment vertices 124 and/or a 3D representation of the character body and garment constructed from the modified set of garment vertices 124 can be displayed in a user interface of a computing device.

Figure 4:
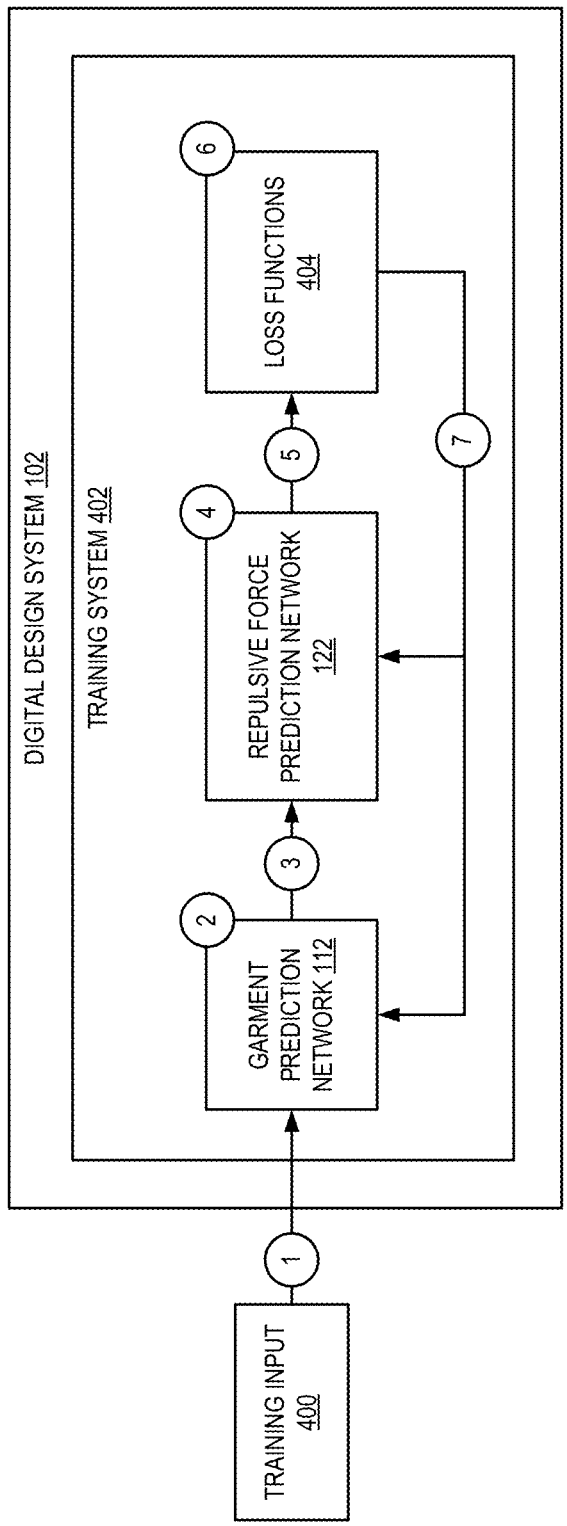
FIG. 4 illustrates a diagram of a training system for training a machine learning model to determine garment vertex offsets to handle garment collisions with a character body in accordance with one or more embodiments.

FIG. 4 illustrates a diagram of a training system for training a machine learning model to determine garment vertex offsets to handle garment collisions with a character body in accordance with one or more embodiments. In one or more embodiments, a training system 402 is configured to train neural networks (e.g., garment prediction network 112 and repulsive force prediction network 122) to generate offset distances for body-penetrating garment vertices to move them to positions outside the character body. In one or more embodiments, the garment prediction network 112 and the repulsive force prediction network 122 are trained with the ground truth collision-free garment data (e.g., the positions of the garment vertices are outside the character body). In such embodiments, the reconstruction loss can guide the prediction of the $x_i$ and $\alpha_i$ to move $x'_i$ to a position with no edge-edge collisions. Training with this ground truth data can also better preserve the local smoothness and details of the garment.

Although the training system 402 is depicted as part of digital design system 102, in various embodiments, training system 402 can be a standalone system or a separate system implemented on electronic devices separate from the electronic devices implementing digital design system 102. In such embodiments, the training system 402 can be deployed to the digital design system 102.

As shown in FIG. 1, the training system 402 receives a training input 400, as shown at numeral 1. For example, the digital design system 102 receives the training input 400 from a user via a computing device or from a memory or storage location. In one or more embodiments, the training input 400 includes body shape parameters, body pose parameters, and garment style parameters. The training input 400 can also include ground truth garment vertices indicating the position of the garment vertices relative to the character body with originally character body-penetrating garment vertices moved to offset positions such that they are no longer body-penetrating. In one or more embodiments, the training input 400 is received by a garment prediction network 112.

In one or more embodiments, the garment prediction network 112 generates a set of garment vertices, $\{x_i\}_{i=1}^N$, from the training input 400, at numeral 2. In some embodiments, the garment prediction network 112 is a pre-trained neural network that predicts the deformations of a garment with a three-dimensional character body using body shape parameters, body pose parameters, and garment style parameters. In one or more embodiments, after generating the set of garment vertices, the garment prediction network 112 sends the set of garment vertices to a repulsive force prediction network 122, as shown at numeral 3.

In one or more embodiments, the repulsive force prediction network 122 is attached to the end of the garment prediction network 112 (e.g., TailorNet) to receive the set of garment vertices generated by the garment prediction network 112. In one or more embodiments, the repulsive force prediction network 122 predicts a modified set of garment vertices, including one or more garment vertices at modified garment vertex positions with an offset distance to resolve their collisions with the character body, at numeral 4, as described above with respect to FIG. 1.

In one or more embodiments, the repulsive force prediction network 122 sends the modified set of garment vertices (with a predicted offset for one or more garment vertices) to loss functions 404, as shown at numeral 5. The loss functions 404 also receives the ground truth garment vertices (e.g., received in the training input 400). The loss functions 404 use the ground truth garment vertices and the predicted modified garment vertex positions from the repulsive force prediction network 122 to calculate a loss, at numeral 6. Assuming the predicted modified garment vertex positions from the repulsive force prediction network 122 are $\{x'_i\}_{i=1}^N$ and the corresponding ground truths are $\{\tilde{x}_i\}_{i=1}^N$, the following loss functions can be used to train the garment prediction network 112 and the repulsive force prediction network 122:

$$\mathcal{L} = \lambda_1 \mathcal{L}_r + \lambda_2 \mathcal{L}_c$$

$$\mathcal{L}_r = \sum_{i=1}^N \|x'_i - \tilde{x}_i\|_2^2$$

$$\mathcal{L}_c = \sum_{i=1}^N |\max(-f(x'_i), 0)|,$$

where $\mathcal{L}_r$ is the reconstruction loss, $\mathcal{L}_c$ is the collision loss to cover missed penetrated vertices, and $\lambda_{1,2}$ are weights to balance the loss terms. The loss calculated using the loss functions 404 can then be backpropagated to the garment prediction network 112 and repulsive force prediction network 122, as shown at numeral 7.

Figure 5:
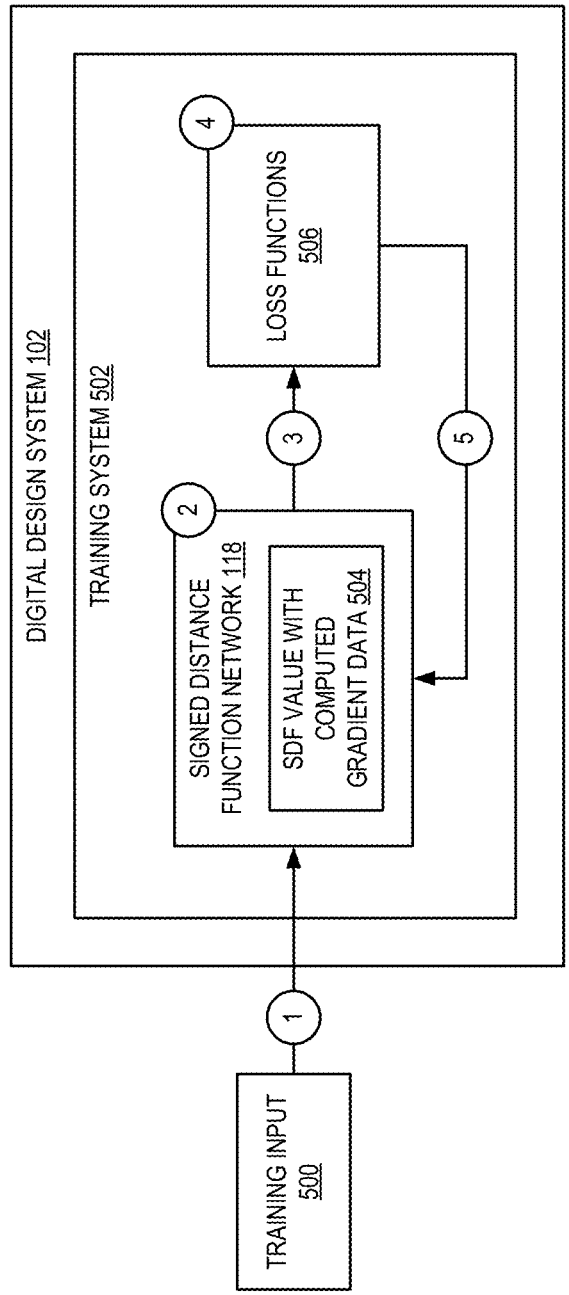
FIG. 5 illustrates a diagram of a training system for training a machine learning model to determine garment vertex offsets to handle garment collisions with a character body in accordance with one or more embodiments.

FIG. 5 illustrates a diagram of a training system for training a machine learning model to determine garment vertex offsets to handle garment collisions with a character body in accordance with one or more embodiments. In one or more embodiments, a training system 502 is configured to train a neural network (e.g., signed distance function network 118) to generate signed distance function (SDF) value with computed gradient data 504, including a direction and a distance value for each garment vertices to a closet point on the surface of the character body, which can be used to indicate whether the garment vertex is inside or outside the character body. The SDF value with computed gradient data 504 also includes the gradient of the distance value of each garment vertex sampled from the body surface. In one or more embodiments, accurate signed distance function data determined using analytic methods is used during the training process, while approximated signed distance function data determined using machine learning models is used during inference. Although the training system 502 is depicted as part of digital design system 102, in various embodiments, training system 502 can be a standalone system or a separate system implemented on electronic devices separate from the electronic devices implementing digital design system 102. In such embodiments, the training system 502 can be deployed to the digital design system 102.

As shown in FIG. 1, the training system 502 receives a training input 500, as shown at numeral 1. For example, the digital design system 102 receives the training input 500 from a user via a computing device or from a memory or storage location. In one or more embodiments, the training input 500 includes query point-body pairs and corresponding ground truth signed distance function values. The query point-body pairs can include garment-body pairs. In one or more embodiments, the training input 500 is received by a signed distance function network 118.

In one or more embodiments, the signed distance function network 118 processes the query point-body pairs, at numeral 2. In one or more embodiments, for each ground truth query point-body pair in the training input 500, three categories of signed distance function value samples are collected. The first category includes randomly sampled points from the body surface, with or without Gaussian disturbance. For sampled points located on the body surface, their normals are also collected. In one or more embodiments, the signed distance function network 118 can determine correct signed distance function gradients for the surface points which are their normals. For other points, the signed distance function network 118 estimates their gradients through analytic methods (e.g., using the Eikonal equation). The second category includes randomly sampled points from the garment surface, with or without Gaussian disturbance. The third category includes randomly sampled points inside the bounding box of the body. We use a general bounding box for all the samples with size 4 m×4 m×4 m, centering at [0, 0, 0]. Points from the body surface with a gradient are denoted as $\{x_i\}_{i \in I_S}$ and their corresponding normals as $\{n_i\}_{i \in I_S}$, and can be evaluated using loss function $\mathcal{L}_{sg}$. Other points without a gradient are denoted as $\{x_j\}_{j \in I_E}$ The ground truth signed distance function values for all the points can be represented as $\{s_i\}_{i \in I_S \cup I_E}$, and can be evaluated using loss function $\mathcal{L}_v$.

In one or more embodiments, the signed distance function network 118 sends the SDF value with computed gradient data 504 to loss functions 506, as shown at numeral 3. The loss functions 506 also receives the query point-body pairs and corresponding ground truth signed distance function values (e.g., received in the training input 500). The loss functions 506 uses the query point-body pairs and the SDF value with computed gradient data 504 to calculate a loss, at numeral 4. The loss can then be computed as follows:

$\mathcal{L}_{SDF} = \lambda_a \mathcal{L}_v + \lambda_b \mathcal{L}_{sg} + \lambda_c \mathcal{L}_{se}$ $\mathcal{L}_v = \mathbb{E}_{i \in I_S \cup I_E}(|f(x_i) - s_i|)$ $\mathcal{L}_{sg} = \mathbb{E}_{i \in I_S}(\|\nabla_x f(x_i) - n_i\|)$ $\mathcal{L}_{se} = \mathbb{E}_{i \in I_E}(\|\nabla_x f(x_i)\| - 1)^2$ where $\mathcal{L}_v$ is a regression loss for the values, and $\mathcal{L}_{sg}$ and $\mathcal{L}_{se}$ are losses for the gradients. Specifically, $\mathcal{L}_{se}$ is based on the Eikonal equation. In one or more embodiments, the weights are set to balance each term as $\lambda_a = 2$, $\lambda_b = 1$, and $\lambda_c = 0.1$. The loss calculated using the loss functions 506 can then be backpropagated to the signed distance function network 118, as shown at numeral 5.

Figure 6:
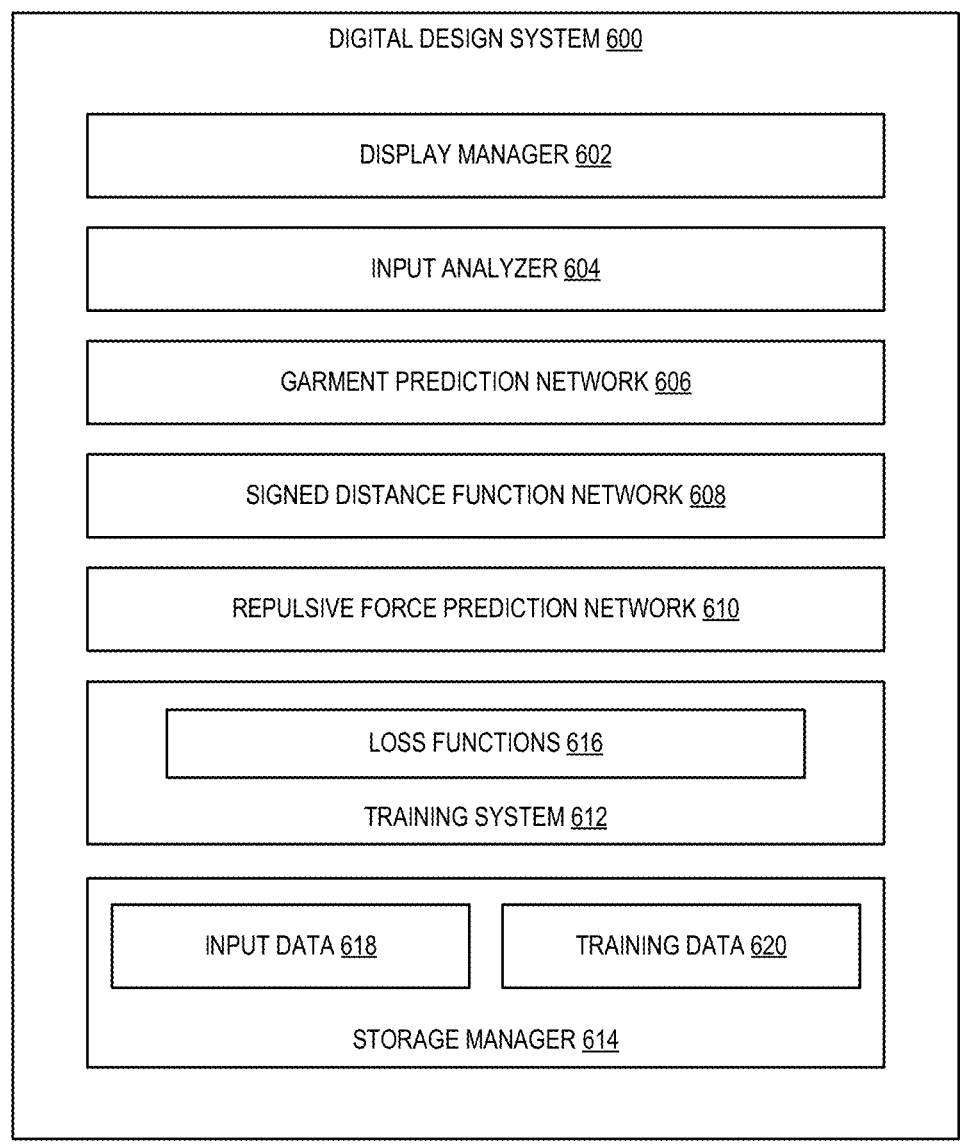
FIG. 6 illustrates a schematic diagram of a digital design system in accordance with one or more embodiments.

FIG. 6 illustrates a schematic diagram of a digital design system (e.g., "digital design system" described above) in accordance with one or more embodiments. As shown, the digital design system 600 may include, but is not limited to, a display manager 602, an input analyzer 604, a garment prediction network 606, a signed distance function network 608, a repulsive force prediction network 610, a training system 612, and a storage manager 614. As shown, the training system 612 includes loss functions 616. The storage manager 614 includes input data 618 and training data 620.

As illustrated in FIG. 6, the digital design system 600 includes a display manager 602. In one or more embodiments, the display manager 602 identifies, provides, manages, and/or controls a user interface provided on a touch screen or other device. Examples of displays include interactive whiteboards, graphical user interfaces (or simply "user interfaces") that allow a user to view and interact with content items, or other items capable of display on a touch screen. For example, the display manager 602 may identify, display, update, or otherwise provide various user interfaces that include one or more display elements in various layouts. In one or more embodiments, the display manager 602 can identify a display provided on a touch screen or other types of displays (e.g., including monitors, projectors, headsets, etc.) that may be interacted with using a variety of input devices. For example, a display may include a graphical user interface including one or more display elements capable of being interacted with via one or more touch gestures or other types of user inputs (e.g., using a stylus, a mouse, or other input devices). Display elements include, but are not limited to buttons, text boxes, menus, thumbnails, scroll bars, hyperlinks, etc.

As further illustrated in FIG. 6, the digital design system 600 also includes an input analyzer 604. The input analyzer 604 analyzes an input received by the digital design system 600 to identify parameters defining a character body (e.g., body shape parameters and body pose parameters) and parameters defining a garment (e.g., garment style parameters).

As further illustrated in FIG. 6, the digital design system 600 also includes garment prediction network 606 configured to predict deformations of a garment relative to a character body using character body shape parameters, character body pose parameters, and garment style parameters. The garment prediction network 606 can be implemented as, or include, one or more machine learning models, such as a neural network or a deep learning model. In one or more embodiments, the neural network of the garment prediction network 606 is trained to predict the garment vertices defining the position and shape of a deformed garment.

As further illustrated in FIG. 6, the digital design system 600 also includes a signed distance function network 608 configured to determine a distance value for each garment vertex in a set of garment vertices predicted by the garment prediction network 606 to a closet point on the surface of the character body. The signed distance function data 120 is also configured to determine the gradient of the distance value of each garment vertex. The signed distance function network 608 can be implemented as, or include, one or more machine learning models, such as a neural network or a deep learning model.

As further illustrated in FIG. 6, the digital design system 600 also includes a repulsive force prediction network 610 configured to predict modified positions of body-penetrating garment vertices to resolve the collision (e.g., move the body-penetrating garment vertices outside the character body). The repulsive force prediction network 610 can be implemented as, or include, one or more machine learning models, such as a neural network or a deep learning model. In one or more embodiments, the neural network of the signed distance function network 608 is trained to predict a distance along a repulsion direction (e.g., the direction towards the closest point on the surface of the character body from a garment vertex) to move each body-penetrating garment vertex.

As further illustrated in FIG. 6, the digital design system 600 includes training system 612 which is configured to teach, guide, tune, and/or train one or more neural networks. In particular, the training system 612 trains neural networks, such as garment prediction network 606, signed distance function network 608, and repulsive force prediction network 610, based on training data and using loss functions 616.

As further illustrated in FIG. 6, the storage manager 614 includes input data 618 and training data 620. In particular, the input data 618 may include parameters defining a character body (e.g., body shape parameters and body pose parameters) and parameters defining a garment (e.g., garment style parameters) received by the digital design system 600. In one or more embodiments, the training data 620 may include training garment and character body pairs that can be used during a training process of the digital design system 600 to train neural networks (e.g., garment prediction network 606, signed distance function network 608, repulsive force prediction network 610).

Each of the components 602-614 of the digital design system 600 and their corresponding elements (as shown in FIG. 6) may be in communication with one another using any suitable communication technologies. It will be recognized that although components 602-614 and their corresponding elements are shown to be separate in FIG. 6, any of components 602-614 and their corresponding elements may be combined into fewer components, such as into a single facility or module, divided into more components, or configured into different components as may serve a particular embodiment.

The components 602-614 and their corresponding elements can comprise software, hardware, or both. For example, the components 602-614 and their corresponding elements can comprise one or more instructions stored on a computer-readable storage medium and executable by processors of one or more computing devices. When executed by the one or more processors, the computer-executable instructions of the digital design system 600 can cause a client device and/or a server device to perform the methods described herein. Alternatively, the components 602-614 and their corresponding elements can comprise hardware, such as a special purpose processing device to perform a certain function or group of functions. Additionally, the components 602-614 and their corresponding elements can comprise a combination of computer-executable instructions and hardware.

Furthermore, the components 602-614 of the digital design system 600 may, for example, be implemented as one or more stand-alone applications, as one or more modules of an application, as one or more plug-ins, as one or more library functions or functions that may be called by other applications, and/or as a cloud-computing model. Thus, the components 602-614 of the digital design system 600 may be implemented as a stand-alone application, such as a desktop or mobile application. Furthermore, the components 602-614 of the digital design system 600 may be implemented as one or more web-based applications hosted on a remote server. Alternatively, or additionally, the components of the digital design system 600 may be implemented in a suit of mobile device applications or "apps."

Figure 7:
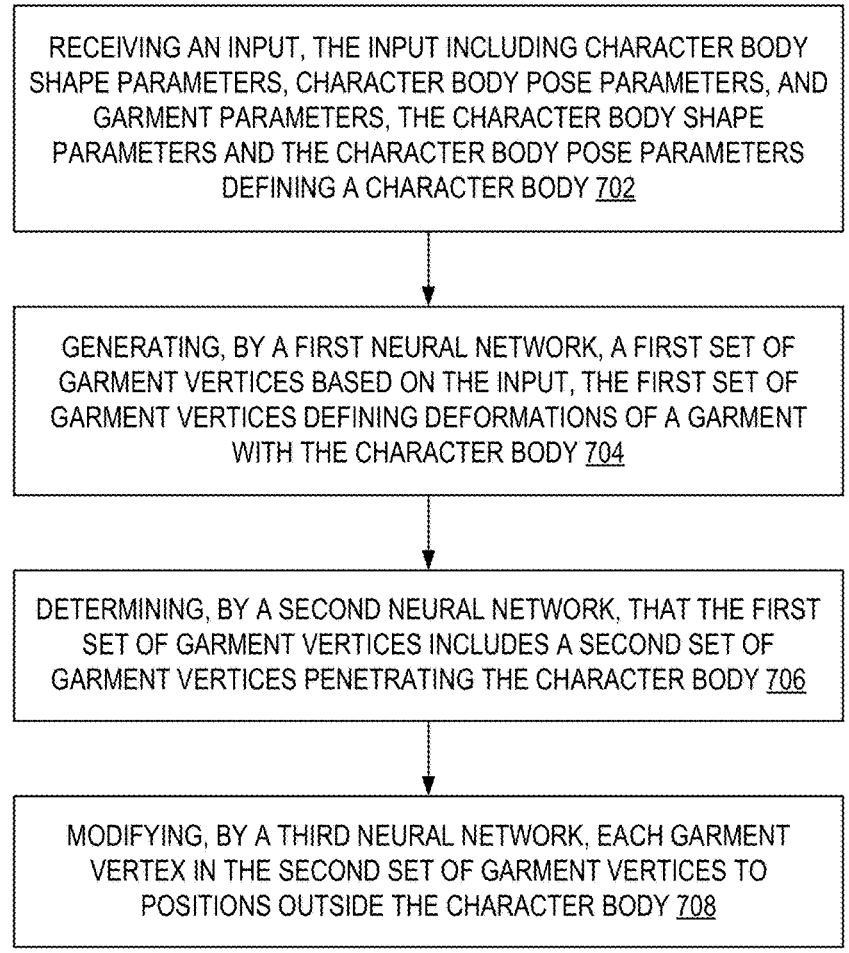
FIG. 7 illustrates a flowchart of a series of acts in a method of performing three-dimensional deformation of a garment due to character body motion with collision handling by a digital design system in accordance with one or more embodiments.

FIGS. 1-6, the corresponding text, and the examples, provide a number of different systems and devices that allow a digital design system to perform three-dimensional deformation of a garment due to character body motion with collision handling. In addition to the foregoing, embodiments can also be described in terms of flowcharts comprising acts and steps in a method for accomplishing a particular result. For example, FIG. 7 illustrates a flowchart of an exemplary method in accordance with one or more embodiments. The method described in relation to FIG. 7 may be performed with less or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of a series of acts in a method of performing three-dimensional deformation of a garment due to character body motion with collision handling by a digital design system in accordance with one or more embodiments. In one or more embodiments, the method 700 is performed in a digital medium environment that includes the digital design system 600. The method 700 is intended to be illustrative of one or more methods in accordance with the present disclosure and is not intended to limit potential embodiments. Alternative embodiments can include additional, fewer, or different steps than those articulated in FIG. 7.

As shown in FIG. 7, the method 700 includes an act 702 of receiving an input, the input including character body shape parameters, character body pose parameters, and garment parameters, the character body shape parameters and the character body pose parameters defining a character body. In one or more embodiments, the digital design system receives the input from a user (e.g., via a computing device). In one or more embodiments, the user may select or provide the parameters via an application, or the user may submit the parameters to a web service or an application configured to receive inputs.

As shown in FIG. 7, the method 700 also includes an act 704 of generating, by a first neural network, a first set of garment vertices based on the input, the first set of garment vertices defining deformations of a garment with the character body.

As shown in FIG. 7, the method 700 also includes an act 706 of determining, by a second neural network, that the first set of garment vertices includes a second set of garment vertices penetrating the character body. In one or more embodiments, the second neural network processes the first set of garment vertices, generated by the first neural network, to determine distance values for each garment vertex of the first set of garment vertices to a closest point on a surface of the character body. The distance value is determined using a signed distance function, where a negative distance value for a garment vertex indicates that it is located within or inside the character body (e.g., a body-penetrating garment vertex), while a positive distance values for a garment vertex indicates that it is located outside the character body (e.g., a non-body-penetrating garment vertex). Using the determined distance values, the garment vertices with negative distances values can be grouped into a second set of garment vertices that includes only those garment vertices that are body-penetrating. The second set of garment vertices can further include garment vertices that are determined to be on the surface of the character body (e.g., have a distance value of "0") and/or garment vertices that are non-body-penetrating but are within a threshold distance from the surface of the character body.

As shown in FIG. 7, the method 700 also includes an act 708 of modifying, by a third neural network, each garment vertex in the second set of garment vertices to positions outside the character body. The third neural network can include a Multilayer Perceptron (MLP) network trained to predict an offset distance for each garment vertex in the second set of garment vertices that would relocate the garment vertices outside the character body. In one or more embodiments, the third neural network processes a feature vector representing the input and the first set of garment vertices generated by the first neural network, and the distance value of each garment vertex in the second set of garment vertices, and its gradient, generated by the second neural network. Using this information, for each garment vertex in the second set of garment vertices, the third neural network predicts an offset distance along a direction of a gradient of the distance value associated with the corresponding garment vertex. The location of the garment vertex can then be modified from its initial location to the modified location (e.g., the offset distance in the direction of the gradient). The modified second set of garment vertices can then be combined with the garment vertices from the first set of garment vertices that were non-body-penetrating (e.g., not in the second set of garment vertices) to define the final set of garment vertices defining the deformations of the garment with respect to the character body without body collisions.

Figure 8:
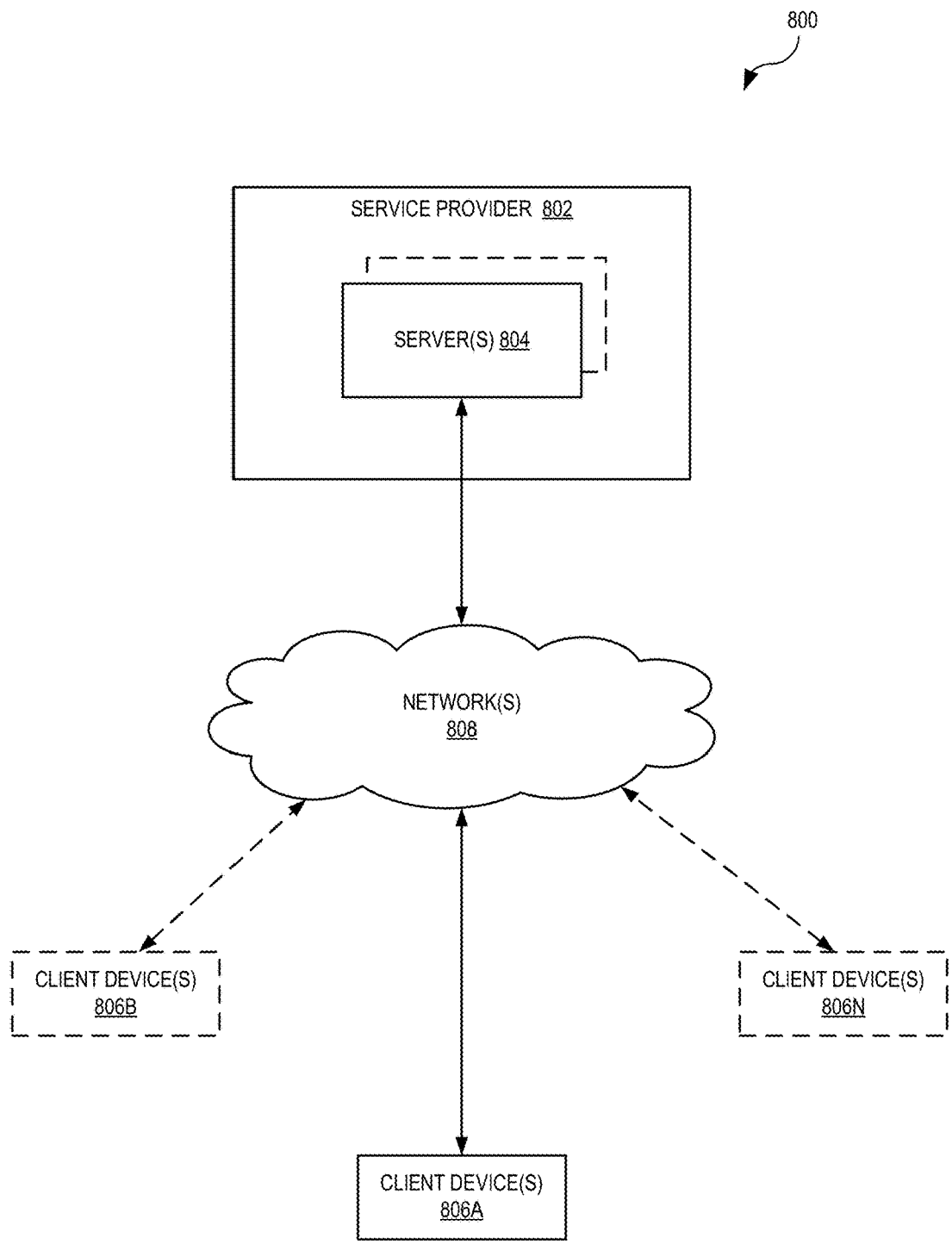
FIG. 8 illustrates a schematic diagram of an exemplary environment in which the digital design system can operate in accordance with one or more embodiments.

FIG. 8 illustrates a schematic diagram of an exemplary environment 800 in which the digital design system 600 can operate in accordance with one or more embodiments. In one or more embodiments, the environment 800 includes a service provider 802 which may include one or more servers 804 connected to a plurality of client devices 806A-806N via one or more networks 808. The client devices 806A-806N, the one or more networks 808 the service provider 802, and the one or more servers 804 may communicate with each other or other components using any communication platforms and technologies suitable for transporting data and/or communication signals, including any known communication technologies, devices, media, and protocols supportive of remote data communications, examples of which will be described in more detail below with respect to FIG. 9.

Although FIG. 8 illustrates a particular arrangement of the client devices 806A-806N 806N, the one or more networks 808, the service provider 802, and the one or more servers 804, various additional arrangements are possible. For example, the client devices 806A-806N may directly communicate with the one or more servers 804, bypassing the network 808. Or alternatively, the client devices 806A-806N may directly communicate with each other. The service provider 802 may be a public cloud service provider which owns and operates their own infrastructure in one or more data centers and provides this infrastructure to customers and end users on demand to host applications on the one or more servers 804. The servers may include one or more hardware servers (e.g., hosts), each with its own computing resources (e.g., processors, memory, disk space, networking bandwidth, etc.) which may be securely divided between multiple customers, each of which may host their own applications on the one or more servers 804. In some embodiments, the service provider may be a private cloud provider which maintains cloud infrastructure for a single organization. The one or more servers 804 may similarly include one or more hardware servers, each with its own computing resources, which are divided among applications hosted by the one or more servers for use by members of the organization or their customers.

Similarly, although the environment 800 of FIG. 8 is depicted as having various components, the environment 800 may have additional or alternative components. For example, the environment 800 can be implemented on a single computing device with the digital design system 600. In particular, the digital design system 600 may be implemented in whole or in part on the client device 806A. Alternatively, in some embodiments, the environment 800 is implemented in a distributed architecture across multiple computing devices.

As illustrated in FIG. 8, the environment 800 may include client devices 806A-806N. The client devices 806A-806N may comprise any computing device. For example, client devices 806A-806N may comprise one or more personal computers, laptop computers, mobile devices, mobile phones, tablets, special purpose computers, TVs, or other computing devices, including computing devices described below with regard to FIG. 9. Although three client devices are shown in FIG. 8, it will be appreciated that client devices 806A-806N may comprise any number of client devices (greater or smaller than shown).

Moreover, as illustrated in FIG. 8, the client devices 806A-806N and the one or more servers 804 may communicate via one or more networks 808. The one or more networks 808 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 808 may be any suitable network over which the client devices 806A-806N may access the service provider 802 and server 804, or vice versa. The one or more networks 808 will be discussed in more detail below with regard to FIG. 9.

In addition, the environment 800 may also include one or more servers 804. The one or more servers 804 may generate, store, receive, and transmit any type of data, including input data 618 and training data 620 or other information. For example, a server 804 may receive data from a client device, such as the client device 806A, and send the data to another client device, such as the client device 806B and/or 806N. The server 804 can also transmit electronic messages between one or more users of the environment 800. In one example embodiment, the server 804 is a data server. The server 804 can also comprise a communication server or a web-hosting server. Additional details regarding the server 804 will be discussed below with respect to FIG. 9.

As mentioned, in one or more embodiments, the one or more servers 804 can include or implement at least a portion of the digital design system 600. In particular, the digital design system 600 can comprise an application running on the one or more servers 804 or a portion of the digital design system 600 can be downloaded from the one or more servers 804. For example, the digital design system 600 can include a web hosting application that allows the client devices 806A-806N to interact with content hosted at the one or more servers 804. To illustrate, in one or more embodiments of the environment 800, one or more client devices 806A-806N can access a webpage supported by the one or more servers 804. In particular, the client device 806A can run a web application (e.g., a web browser) to allow a user to access, view, and/or interact with a webpage or website hosted at the one or more servers 804.

Upon the client device 806A accessing a webpage or other web application hosted at the one or more servers 804, in one or more embodiments, the one or more servers 804 can provide a user of the client device 806A with an interface to provide inputs, including character body shape parameters, character body pose parameters, and garment style parameters. Upon receiving the inputs, the one or more servers 804 can automatically perform the methods and processes described above to predict garment vertices of a garment relative to a character body, including per-vertex offsets that push body-penetrating garment vertices to a collision-free position.

As just described, the digital design system 600 may be implemented in whole, or in part, by the individual elements 802-808 of the environment 800. It will be appreciated that although certain components of the digital design system 600 are described in the previous examples with regard to particular elements of the environment 800, various alternative implementations are possible. For instance, in one or more embodiments, the digital design system 600 is implemented on any of the client devices 806A-806N. Similarly, in one or more embodiments, the digital design system 600 may be implemented on the one or more servers 804. Moreover, different components and functions of the digital design system 600 may be implemented separately among client devices 806A-806N, the one or more servers 804, and the network 808.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
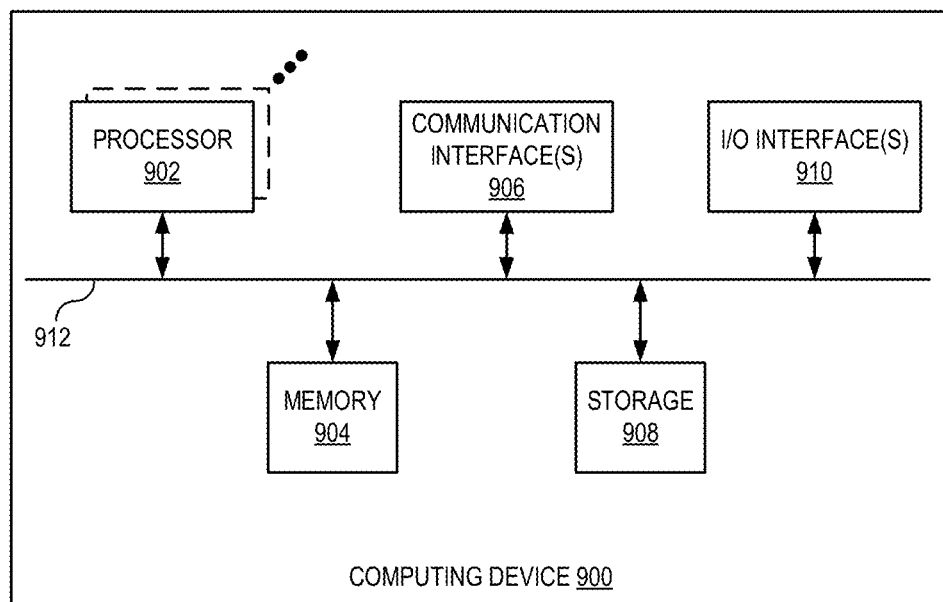
FIG. 9 illustrates a block diagram of an exemplary computing device in accordance with one or more embodiments.

FIG. 9 illustrates, in block diagram form, an exemplary computing device 900 that may be configured to perform one or more of the processes described above. One will appreciate that one or more computing devices such as the computing device 900 may implement the digital design system 600. As shown by FIG. 9, the computing device can comprise a processor 902, memory 904, one or more communication interfaces 906, a storage device 908, and one or more input or output ("I/O") devices/interfaces 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 908 and decode and execute them. In various embodiments, the processor(s) 902 may include one or more central processing units (CPUs), graphics processing units (GPUs), field programmable gate arrays (FPGAs), systems on chip (SoC), or other processor(s) or combinations of processors.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 can further include one or more communication interfaces 906. A communication interface 906 can include hardware, software, or both. The communication interface 906 can provide one or more interfaces for communication (such as, for example, packet-based communication) between the computing device and one or more other computing devices 900 or one or more networks. As an example, and not by way of limitation, communication interface 906 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

The computing device 900 includes a storage device 908 includes storage for storing data or instructions. As an example, and not by way of limitation, storage device 908 can comprise a non-transitory storage medium described above. The storage device 908 may include a hard disk drive (HDD), flash memory, a Universal Serial Bus (USB) drive or a combination these or other storage devices. The computing device 900 also includes one or more I/O devices/interfaces 910, which are provided to allow a user to provide input to (such as user strokes), receive output from, and otherwise transfer data to and from the computing device 900. These I/O devices/interfaces 910 may include a mouse, keypad or a keyboard, a touch screen, camera, optical scanner, network interface, modem, other known I/O devices or a combination of such I/O devices/interfaces 910. The touch screen may be activated with a stylus or a finger.

The I/O devices/interfaces 910 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 910 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method, comprising:
receiving an input, the input including character body shape parameters, character body pose parameters, and garment parameters, the character body shape parameters and the character body pose parameters defining a character body;

generating, by a first neural network, a first set of garment vertices based on the input, the first set of garment vertices defining deformations of a garment with the character body;

determining, by a second neural network, that the first set of garment vertices includes a second set of garment vertices penetrating the character body; and modifying, by a third neural network, each garment vertex in the second set of garment vertices to positions outside the character body.

2. The computer-implemented method of claim 1, wherein determining that the first set of garment vertices includes the second set of garment vertices penetrating the character body comprises:

processing, by the second neural network, the first set of garment vertices to determine distance values for each garment vertex of the first set of garment vertices to a closest point on a surface of the character body; and for each garment vertex of the first set of garment vertices, determining that the garment vertex is in the second set of garment vertices when a distance value of the garment vertex to the closest point on the surface of the character body indicates that the garment vertex is inside the character body.

3. The computer-implemented method of claim 2, wherein the distance value of the garment vertex to the closest point on the surface of the character body indicates that the garment vertex is inside the character body when the distance value is a negative value.

4. The computer-implemented method of claim 2, further comprising:

for each garment vertex of the second set of garment vertices, determining a gradient of the determined distance value.

5. The computer-implemented method of claim 2, wherein modifying each garment vertex in the second set of garment vertices to the positions outside the character body comprises:

for each garment vertex of the second set of garment vertices:
  predicting an offset distance along a direction of a gradient of the distance value associated with the corresponding garment vertex, and
  modifying a location of the garment vertex from an initial location to an updated location based on the predicted offset distance.

6. The computer-implemented method of claim 5, wherein predicting the offset distance along the direction of the gradient of the distance value associated with the corresponding garment vertex comprises:

processing, by the third neural network, a feature vector representing the input, the first set of garment vertices, the distance value of each garment vertex in the second set of garment vertices, and a gradient of the distance value of each garment vertex in the second set of garment vertices.

7. The computer-implemented method of claim 1, further comprising:

generating an updated set of garment vertices including the first set of garment vertices not in the second set of garment vertices and the modified second set of garment vertices.

8. A non-transitory computer-readable medium storing executable instructions, which when executed by a processing device, cause the processing device to perform operations comprising:

receiving an input, the input including character body shape parameters, character body pose parameters, and garment parameters, the character body shape parameters and the character body pose parameters defining a character body;

generating, by a first neural network, a first set of garment vertices based on the input, the first set of garment vertices defining deformations of a garment with the character body;

determining, by a second neural network, that the first set of garment vertices includes a second set of garment vertices penetrating the character body; and modifying, by a third neural network, each garment vertex in the second set of garment vertices to positions outside the character body.

9. The non-transitory computer-readable medium of claim 8, wherein to determine that the first set of garment vertices includes the second set of garment vertices penetrating the character body, the instructions further cause the processing device to perform operations comprising:

processing, by the second neural network, the first set of garment vertices to determine distance values for each garment vertex of the first set of garment vertices to a closest point on a surface of the character body; and for each garment vertex of the first set of garment vertices, determining that the garment vertex is in the second set of garment vertices when a distance value of the garment vertex to the closest point on the surface of the character body indicates that the garment vertex is inside the character body.

10. The non-transitory computer-readable medium of claim 9, wherein the distance value of the garment vertex to the closest point on the surface of the character body indicates that the garment vertex is inside the character body when the distance value is a negative value.

11. The non-transitory computer-readable medium of claim 9, wherein the instructions further cause the processing device to perform operations comprising:

for each garment vertex of the second set of garment vertices, determining a gradient of the determined distance value.

12. The non-transitory computer-readable medium of claim 9, wherein to modify each garment vertex in the second set of garment vertices to the positions outside the character body, the instructions further cause the processing device to perform operations comprising:

for each garment vertex of the second set of garment vertices:
  predicting an offset distance along a direction of a gradient of the distance value associated with the corresponding garment vertex, and
  modifying a location of the garment vertex from an initial location to an updated location based on the predicted offset distance.

13. The non-transitory computer-readable medium of claim 12, wherein to predict the offset distance along the direction of the gradient of the distance value associated with the corresponding garment vertex, the instructions further cause the processing device to perform operations comprising:

processing, by the third neural network, a feature vector representing the input, the first set of garment vertices, the distance value of each garment vertex in the second set of garment vertices, and a gradient of the distance value of each garment vertex in the second set of garment vertices.

14. The non-transitory computer-readable medium of claim 9, wherein the instructions further cause the processing device to perform operations comprising:
generating an updated set of garment vertices including the first set of garment vertices not in the second set of garment vertices and the modified second set of garment vertices.

15. A system comprising:
a memory component; and
a processing device coupled to the memory component, the processing device to perform operations comprising:
receiving an input, the input including character body shape parameters, character body pose parameters, and garment parameters, the character body shape parameters and the character body pose parameters defining a character body;
generating, by a first neural network, a first set of garment vertices based on the input, the first set of garment vertices defining deformations of a garment with the character body;
determining, by a second neural network, that the first set of garment vertices includes a second set of garment vertices penetrating the character body; and
modifying, by a third neural network, each garment vertex in the second set of garment vertices to positions outside the character body.

16. The system of claim 15, wherein to determine that the first set of garment vertices includes the second set of garment vertices penetrating the character body the processing device further performs operations comprising:
processing, by the second neural network, the first set of garment vertices to determine distance values for each garment vertex of the first set of garment vertices to a closest point on a surface of the character body; and
for each garment vertex of the first set of garment vertices, determining that the garment vertex is in the second set of garment vertices when a distance value of the garment vertex to the closest point on the surface of the character body indicates that the garment vertex is inside the character body.

17. The system of claim 16, wherein the distance value of the garment vertex to the closest point on the surface of the character body indicates that the garment vertex is inside the character body when the distance value is a negative value.

18. The system of claim 16, wherein the processing device further performs operations comprising:
for each garment vertex of the second set of garment vertices, determining a gradient of the determined distance value.

19. The system of claim 16, wherein to modify each garment vertex in the second set of garment vertices to the positions outside the character body, the processing device further performs operations comprising:
for each garment vertex of the second set of garment vertices:
predicting an offset distance along a direction of a gradient of the distance value associated with the corresponding garment vertex, and
modifying a location of the garment vertex from an initial location to an updated location based on the predicted offset distance.

20. The system of claim 19, wherein to predict the offset distance along the direction of the gradient of the distance value associated with the corresponding garment vertex, the processing device further performs operations comprising:
processing, by the third neural network, a feature vector representing the input, the first set of garment vertices, the distance value of each garment vertex in the second set of garment vertices, and a gradient of the distance value of each garment vertex in the second set of garment vertices.

* * * * *